No. 833,051. PATENTED OCT. 9, 1906.
A. W. HARRISON.
ELECTROMECHANICAL TRANSMISSION DEVICE.
APPLICATION FILED JUNE 12, 1905.

3 SHEETS—SHEET 1.

No. 833,051. PATENTED OCT. 9, 1906.
A. W. HARRISON.
ELECTROMECHANICAL TRANSMISSION DEVICE.
APPLICATION FILED JUNE 12, 1905.

3 SHEETS—SHEET 3.

Witnesses
Inventor
Arthur W. Harrison
by Hazard & Harpham
Attorneys

UNITED STATES PATENT OFFICE.

ARTHUR W. HARRISON, OF LOS ANGELES, CALIFORNIA.

ELECTROMECHANICAL TRANSMISSION DEVICE.

No. 833,051.　　　　　Specification of Letters Patent.　　　　　Patented Oct. 9, 1906.

Application filed June 12, 1905. Serial No. 264,955.

*To all whom it may concern:*

Be it known that I, ARTHUR W. HARRISON, a citizen of the United States, residing at Los Angeles, in the county of Los Angeles and State of California, have invented new and useful Improvements in Electromechanical Transmission Devices, of which the following is a specification.

My invention relates to an electromechanical mechanism for controlling the transmission of electrical energy when applied to driving automobiles and other like mechanisms; and the object thereof is to produce a mechanism which is capable of being run at any desired speed. I accomplish this object by the mechanism described herein and illustrated in the accompanying drawings, in which my invention is illustrated as applied to mechanism for driving an automobile in which a polyphase alternating-current system is used.

Figure 1:
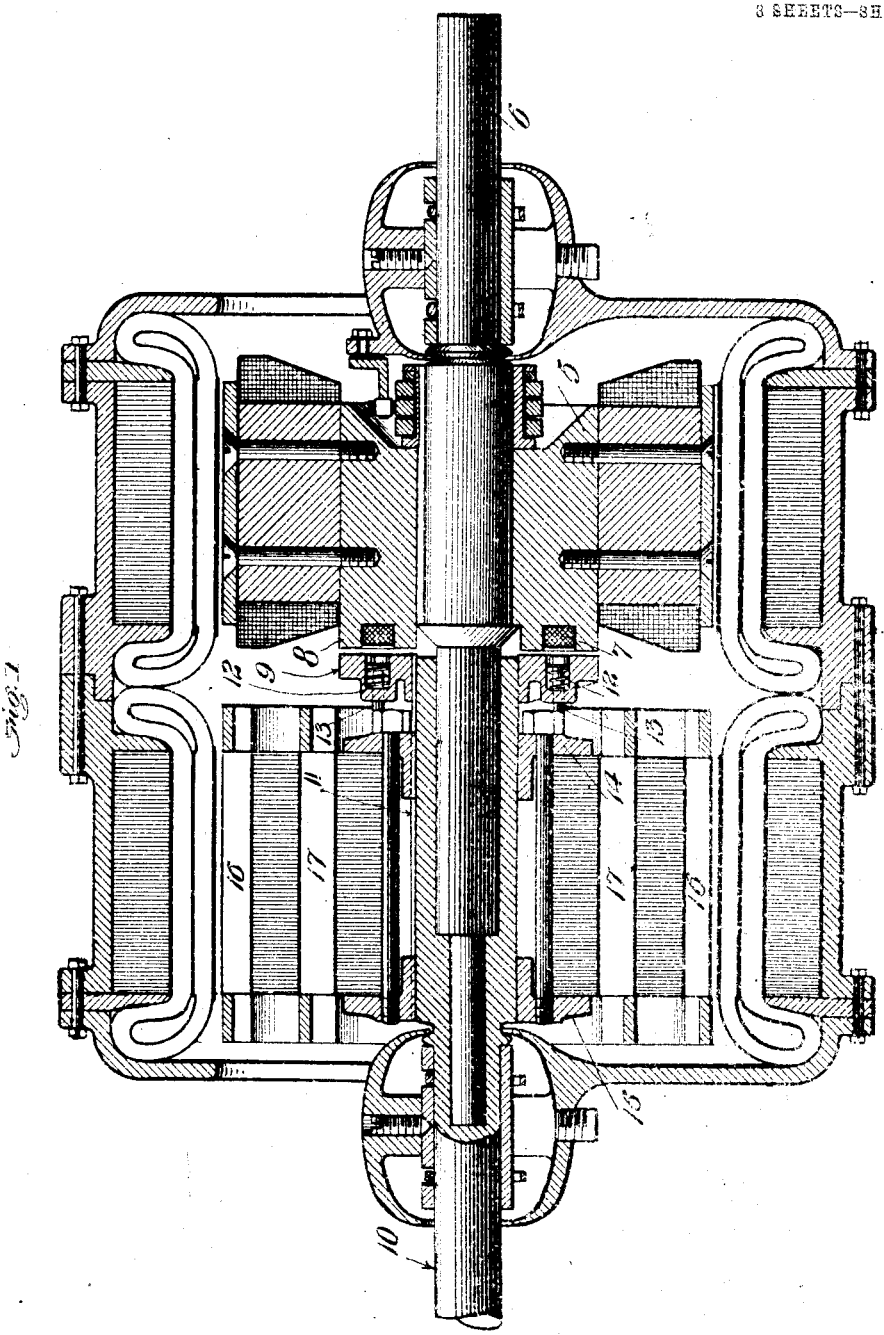
Figure 2:
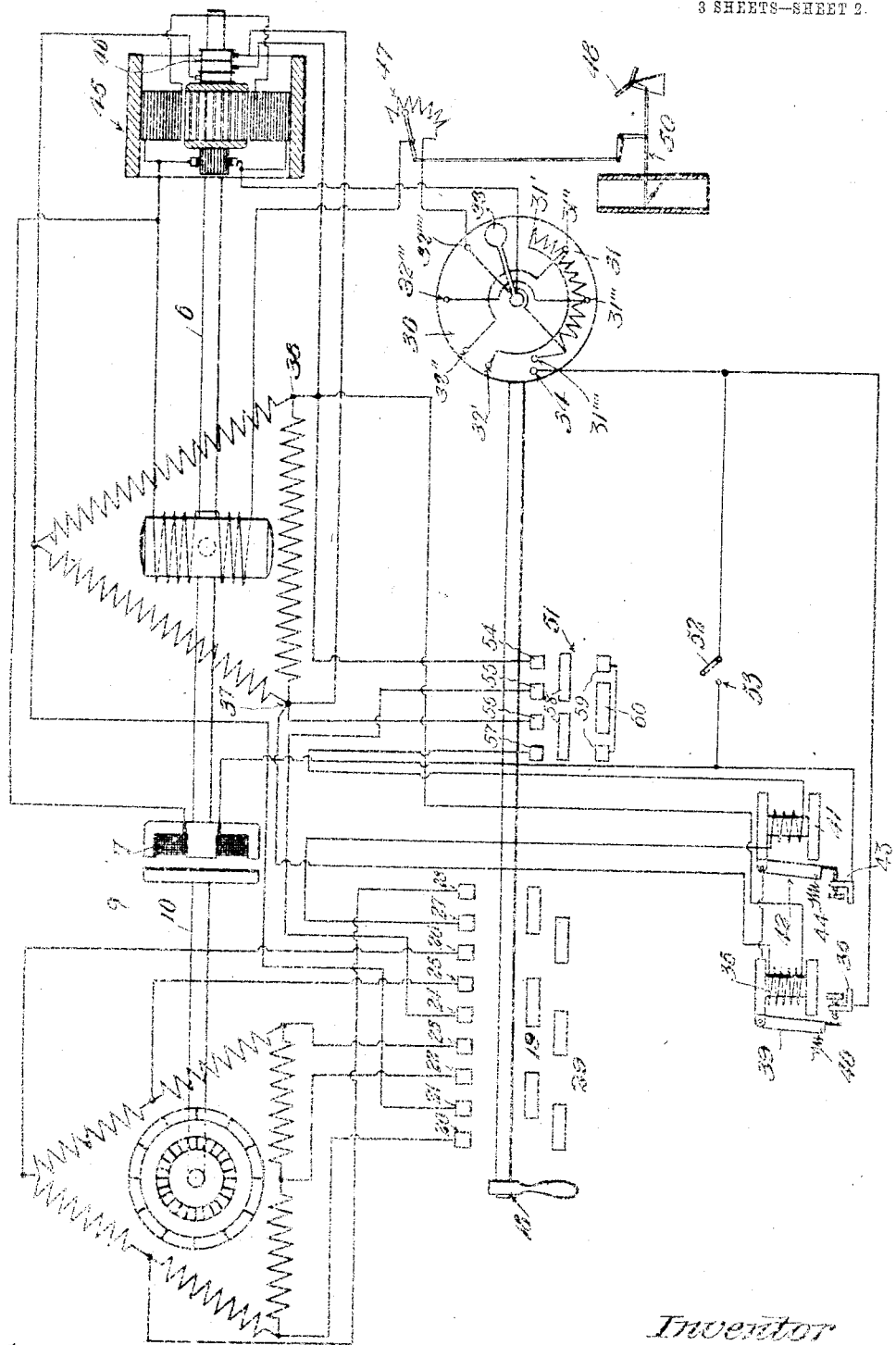
Figure 3:
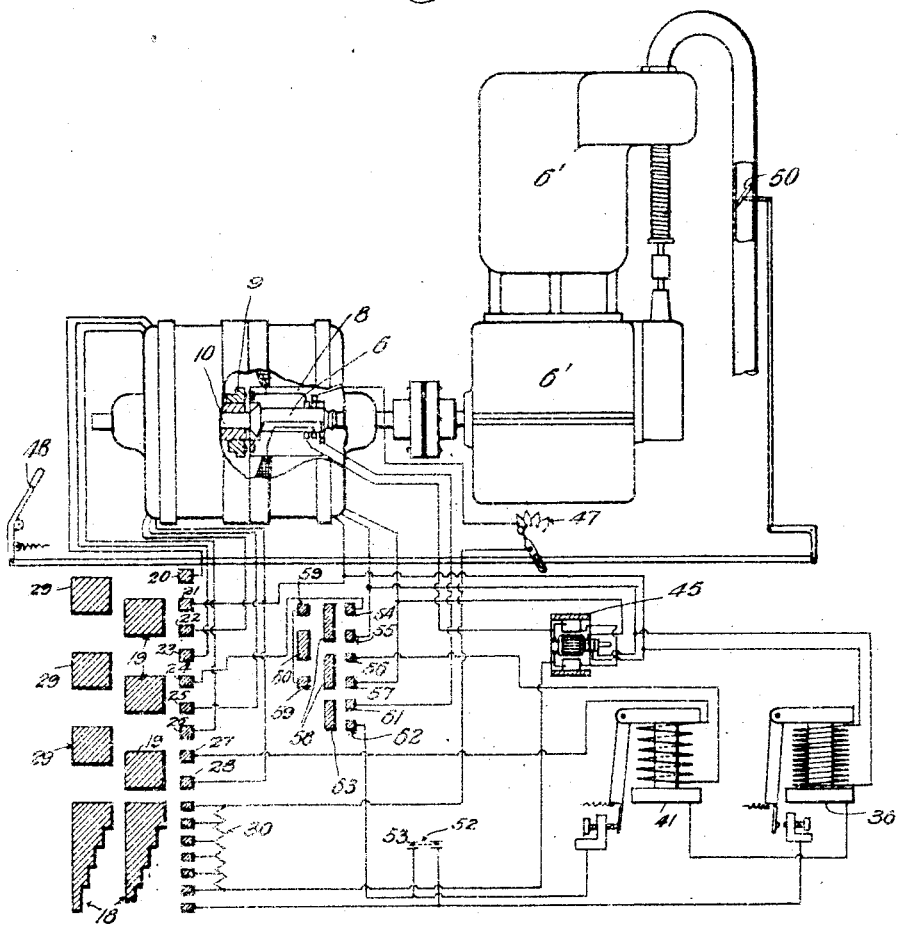

Figure 1 is a longitudinal central section of the electrical mechanism. Fig. 2 is a diagrammatic representation of the circuits and connections. Fig. 3 is a figure showing conventionally the prime mover and other parts, some being in section, some in elevation, and some diagrammatically.

In the drawings the field-magnet 5 of the generator is rigidly secured upon the shaft 6, which is driven by a hydrocarbon or other engine 6', which is shown diagrammatically on Fig. 3. Upon this shaft is rigidly secured the field portion 7 of a magnetic clutch. This field is shown as formed in yoke 8 of the rotary field-magnet of the generator. This yoke is rigidly secured upon shaft 6. Field 7, if desired, may be made separate from the yoke; but I prefer to use the yoke on account of compactness. The armature 9 of the magnetic clutch is slidably secured upon shaft 10 by a key 11. This armature is normally held out of engagement with its field 7 by springs 12, mounted on bolts 13, which bolts are secured to one of the compression-plates 14 of the rotor of the induction-motor. This rotor is secured upon shaft 10 by key 11, which passes through a keyway in the compression-plates 14 and 15. The rotor is preferably provided with a high-resistance squirrel-cage winding 16 to give a high starting torque and a low-resistance squirrel-cage winding 17 to bring the rotor nearly into synchronism with the field-magnet of the generator. The stator of the induction-motor is provided with special connection (shown in Fig. 2) by which the number of poles may be changed and the speed of the rotor varied.

A controller 18, having one or more sets of contacts, (shown as having two sets,) is provided to change the circuits in the stator-winding of the induction-motor. When contacts 19, Fig. 2, engage controller-fingers 21 22 and 24 25 and 27 28, the stator-winding is connected up so as to form the largest number of poles, giving the rotor its minimum speed. When the controller is changed so that contacts 29 engage controller-fingers 20 21 and 23 24 and 26 27, the stator-winding is connected up so as to form the smallest number of poles, thereby giving the rotor its maximum speed. A rheostat 30 is provided with two sets of contacts 31 and 32, cross-connected to one set of resistance and in series with the rotary field-magnet of the generator. In Fig. 3 the stationary contacts are shown diagrammatically as a single set, and the controller-arm is a movable drum with two sets of contacts, each set engaging the stationary contacts at different times to vary the strength of the magnetic field. When the controller-contacts are on low-speed connections, rheostat-contacts 32 will be in use. Before starting, the controller-arm 33 will be off the contacts and lie between contacts 32' and 31''''. When starting, controller-arm 33 will first engage contact 32', which gives the greatest resistance, and as the arm is moved farther on it successively engages contacts 32'' and 32''', giving less resistance, and when it reaches contact 32'''' all resistance is cut out. When changing the controller-contacts to high-speed connections, the rheostat-arm is disengaged from all contacts to prevent sparking at controller-contacts and then lies between contacts 32'''' and 31'. It is then brought in engagement with contact 31', which gives the greatest resistance, and as the arm is moved farther on it successively engages contacts 31'', 31''', and 31'''', when all resistance is cut out. At this time the rheostat-arm also engages contact 34, which contact is connected to contact 35 of relay 36, which relay is connected across the generator-mains 37 and 38. When the magnet is inert, the armature 39 of this relay is held out of engagement with contact 35 by spring 40. When the voltage of the generator reaches a predetermined value, the magnet is energized and draws its armature to engage contact 35. Relay 41 is connected in series with the motor-circuit, and when a large current is flowing in the circuit the magnet draws its armature 42 from engagement with contact 43. When the current falls to a predetermined value, the power of spring 44 overcomes that of the magnet and draws the armature into engagement with contact 43 and when the contacts 34 and 35 are engaged energizes the clutch-magnet, which draws its armature into engagement therewith and locks shafts 6 and 10 together. The rotating field of the generator and the rotor of the motor are then in synchronism. When the traction is increased, as in climbing a hill, the voltage will fall. As soon as the voltage has fallen so low that relay 36 has not sufficient power to hold its armature against the power of spring 40 the armature separates from contact 35, thereby breaking the circuit through the clutch-coils, and its members separate, and the rotor of the motor and field-magnet of the generator are then uncoupled. Thereafter the automobile will run as an electrically-operated machine until the clutch-coils are again energized, as before explained. As the generator and motor are only used at starting and on slow speeds, they may be made with much less capacity than the engine.

A direct-current generator 45 is provided to excite the field-magnet and clutch. It is provided with slip-rings 46, so that it may be run as a synchronous-motor from the polyphase mains to which it is connected, the field of exciter being overexcited for the purpose of raising the low power factor in the mains caused by using the induction-motor. Rheostat 47 is connected in the field-circuit and is operated by foot-lever 48, which also operates the throttle 50 of the engine at the same time. Direction-switch 51 is composed of the stationary contacts 54, 55, 56, and 57, and the movable drum-contacts 58, 59, and 60, and the clutch stationary contacts 61 and 62, and the movable drum-contact 63. When movable drum-contacts 58 engage the stationary contacts 54 to 57 and the clutch stationary contacts 61 and 62 are engaged by the movable contacts 63, the contacts are in position to permit the vehicle to be moved forward when the power is applied. When the switch is operated to bring contacts 59 into engagement with contacts 57 and 54 and contact 60 into engagement with contacts 55 and 56, the contacts are in position to permit the vehicle to be moved backward when the power is applied. On this position of the switch the clutch stationary contacts are not engaged, and hence the clutch-coils are not energized, thereby providing what I term an "electrical stop."

Having described my invention, what I claim as new, and desire to secure by Letters Patent, is—

1. In an electromechanical transmission device the combination of a motor and a generator mounted on independent shafts; a magnetic clutch having its coils carried by the generator-shaft and its armature carried by the motor-shaft; a relay whose coils are connected in series with the motor, said relay having an armature adapted to form a part of the clutch-circuit; a spring connected to said armature to close the clutch-circuit when the current is decreased to a predetermined value.

2. In an electromechanical transmission device the combination of a motor and a generator mounted upon independent shafts; a magnetic clutch having one member carried by the generator-shaft and the other member carried by the motor-shaft; and a relay having its coils connected across the generator-mains and having an armature adapted to close the clutch-circuit when said relay-coils are energized to a predetermined strength.

3. In an electromechanical transmission device the combination of a motor and a generator mounted upon independent shafts; a magnetic clutch having one member carried by one of said shafts and the other member carried by the other shaft, and a direct-current generator adapted to excite the field-magnet coils and clutch-coils.

4. In an electromechanical transmission device the combination of a motor and a generator mounted on independent shafts; means to increase or decrease the excitation of the generator-field, said means comprising a rheostat in series with the said field; and means to operate the rheostat and means to change the number of motor stator-poles.

5. In an electro-mechanical transmission device the combination of a motor and a generator mounted upon independent shafts; a magnetic clutch having one member carried by one of said shafts and the other member carried by the other of said shafts; an exciter-generator adapted to energize the clutch-coils.

6. In an electromechanical transmission device the combination of a motor and generator mounted on independent shafts; a motor-controller; a rheostat in series with the generator-field adapted to increase or decrease the excitation of the generator-field when the motor-controller is operated, said controller and rheostat being mounted on a common shaft; means to operate the controller; and means to change the number of motor stator-poles.

7. In an electromechanical transmission device the combination of a motor and generator mounted upon independent shafts; a rheostat in series with the generator-field; and means adapted to open the generator-field circuit when the motor-controller fingers are changing to different operative positions.

8. In an electromechanical transmission device the combination of a motor and a generator mounted upon independent shafts; a magnetic clutch having one member carried by the generator-shaft and the other part carried by the motor-shaft; means for energizing the coils of the clutch; and means to mechanically short-circuit contacts in the clutch-energizing circuit.

In witness that I claim the foregoing I have hereunto subscribed my name this 16th day of May, 1905.

ARTHUR W. HARRISON.

Witnesses:
G. E. HARPHAM,
HENRY T. HAZARD.